(12) United States Patent
Rodkey et al.

(10) Patent No.: US 7,769,495 B1
(45) Date of Patent: Aug. 3, 2010

(54) POWER MANAGEMENT SYSTEM FOR A HYDROGEN GENERATION NETWORK

(75) Inventors: Ryan Scott Rodkey, Sugar Land, TX (US); John Frank Rodkey, Missouri City, TX (US); Mark Stephen Ledder, Fredricksburg, TX (US); David Lynn Hickey, Rosharon, TX (US); Darren Lynn Ross, Sugar Land, TX (US); Ronald F. Ramsey, St. Petersburg, FL (US)

(73) Assignee: Techradium, Inc., Sugar Land, TX (US)

( * ) Notice: Subject to any disclaimer, the term of this patent is extended or adjusted under 35 U.S.C. 154(b) by 531 days.

(21) Appl. No.: 11/837,285

(22) Filed: Aug. 10, 2007

(51) Int. Cl.
G05D 3/12 (2006.01)
G05D 5/00 (2006.01)
G05D 9/00 (2006.01)
G05D 11/00 (2006.01)
G05D 17/00 (2006.01)

(52) U.S. Cl. ............. 700/286; 700/287; 700/291; 700/295; 700/297

(58) Field of Classification Search ......... 700/286–287, 700/291, 295, 297
See application file for complete search history.

(56) References Cited

U.S. PATENT DOCUMENTS

| | | | |
|---|---|---|---|
| 5,228,529 A * | 7/1993 | Rosner ............... 180/65.225 |
| 5,643,352 A * | 7/1997 | Werth ..................... 75/255 |
| 6,442,241 B1 | 8/2002 | Tsumpes |
| 6,463,462 B1 | 10/2002 | Smith |
| 6,496,568 B1 | 12/2002 | Nelson |
| 6,643,355 B1 | 11/2003 | Tsumpes |
| 6,678,358 B2 | 1/2004 | Langsenkamp et al. |
| 6,683,870 B1 | 1/2004 | Archer |
| 6,697,477 B2 | 2/2004 | Fleischer |
| 6,697,951 B1 * | 2/2004 | Sinha et al. ............. 713/300 |
| 6,816,878 B1 | 11/2004 | Zimmers et al. |
| 6,871,214 B2 | 3/2005 | Parsons |
| 6,912,691 B1 | 6/2005 | Dodrill et al. |
| 6,931,415 B2 | 8/2005 | Nagahara |
| 6,973,166 B1 | 12/2005 | Tsumpes |
| 7,463,986 B2 * | 12/2008 | Hayes ................... 702/62 |
| 7,471,010 B1 * | 12/2008 | Fingersh ................ 290/55 |
| 2002/0032020 A1 | 3/2002 | Brown |
| 2004/0086768 A1 * | 5/2004 | Fleckner et al. .......... 429/38 |
| 2005/0013417 A1 | 1/2005 | Zimmers et al. |
| 2007/0156257 A1 * | 7/2007 | Peters ................... 700/22 |
| 2008/0272934 A1 * | 11/2008 | Wang et al. ........ 340/870.11 |
| 2009/0076661 A1 * | 3/2009 | Pearson et al. .......... 700/291 |

* cited by examiner

Primary Examiner—Ramesh B Patel
(74) Attorney, Agent, or Firm—Buskop Law Group, PC; Wendy Buskop

(57) ABSTRACT

A power management system for a hydrogen generating network comprising: a decentralized hydrogen generation network comprising at least one hydrogen generating device operable by a dispatchable power source, a non-dispatchable power source, or combinations thereof, an administrator interface for transmitting messages from an administrator to the hydrogen generating network, a dynamic information database comprising hydrogen generating device identification, discretionary power consumption information, or combinations thereof, and dispatchable power source information, non-dispatchable power source information, or combinations thereof, and computer instructions for providing messages to the hydrogen generating network. The administrator initiations distribution of at least one message to the hydrogen generation network for providing non-dispatchable power information, dispatchable power information, or combinations thereof to the hydrogen generation network through at least one industry standard protocol, wherein the at least one hydrogen generating device provides at least one response to the administrator interface.

34 Claims, 3 Drawing Sheets

POWER MANAGEMENT SYSTEM FOR A HYDROGEN GENERATION NETWORK

FIELD

The present embodiments relate generally to a power management and monitoring system with an immediate response component for managing power from a plurality of power sources, such as wind, solar, and hydrocarbon-based sources for balanced power distribution to hydrogen generation networks.

BACKGROUND

Hydrogen generation networks require enhanced safety and security while fulfilling their power consumption needs, due to the potential dangers and difficulties posed by the storage and production of hydrogen.

There has been a need to provide power management systems for hydrogen generation networks that can be monitored and managed remotely to promote efficiency and avoid safety hazards presented by hydrogen.

A need exists for a system and method for automating and delivering messages concerning power availability to owners and users of hydrogen generation networks, which include messages to facility managers, individuals, vendors, and others.

A need exists for a system and method that can be used in the face of a major hurricane or other natural disaster to regulate and inform owners and operators of hydrogen generation networks concerning power availability and users of hydrogen generation networks concerning hydrogen availability.

A need exists for a digital information and response system to bridge the gap between the government or other administrative persons and the public for simultaneously communicating power availability with individuals and users, which can include hospitals, fire stations, and first responders, without being limited to one communication device or one message.

A need exists for a method of communication from an administrator which reaches all possible forms of communication devices, so that all members of a power management network can be reached in multiple languages using multiple devices.

The present embodiments meet these needs.

BRIEF DESCRIPTION OF THE DRAWINGS

The detailed description will be better understood in conjunction with the accompanying drawings as follows.

Figure 1:
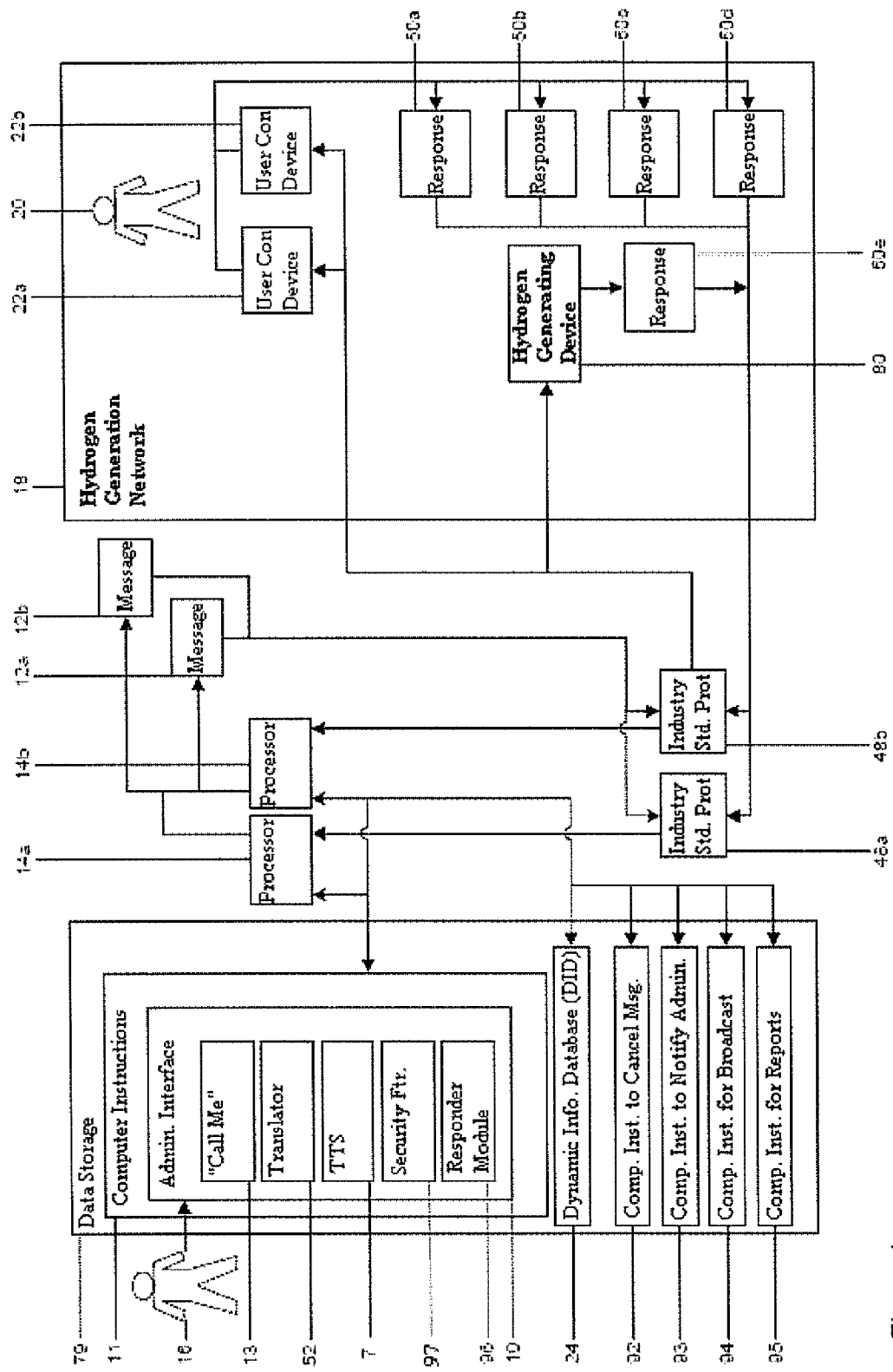
FIG. 1 depicts a representation of an embodiment of a digital notification and response system for handling power management.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to an immediate response information system or emergency system for use during brown outs, periods of high energy demand, and periods where a natural disaster, such as a storm, has destroyed or limited the capacity of energy-providing infrastructure.

The present embodiments relate to a system for creating and delivering messages, routing messages, and verifying and collecting responses to the messages for hydrogen generation networks or owners or users hydrogen generation networks relating to power availability.

The present embodiments are universally applicable to any type of messaging system and device used by message recipients.

The present power management system includes a decentralized hydrogen generation network, having at least one hydrogen generating device, such as a supplemental hydrogen generator, an electrolysis-water hydrogen generator, an electrolyte hydrogen generator, other similar hydrogen generating devices, or combinations thereof, operable by one or more dispatchable or non-dispatchable power sources. One or more hydrogen generating devices can have a hydrogen generating device processor and a hydrogen generating device identification code.

In a contemplated embodiment, a hydrogen generating device can include a controller, such as a software program that uniquely manages power consumption and transmission information for specific users of the hydrogen generating device, a controller identification code, such as a number like 4511-Dacoma, or combinations thereof.

Dispatchable power sources can include, a hydroelectric power plant, a hydrocarbon based electrical production facility, a nuclear power plant, a geothermal power generation facility, a bank of batteries, at least one capacitor, at least one fuel cell, a tidal power generator using ocean tides or currents which provides electricity to the user or the hydrogen generating device, and other similar power sources and facilities.

Non-dispatchable power sources can include a wind power facility, a solar powered facility, an intermittent water supply hydroelectric facility for providing electricity, and similar power sources and facilities.

Each dispatchable and non-dispatchable power source includes related dispatchable power source information and non-dispatchable power source information, such as the capacity of each power source, the availability of power, and other similar information.

The present system can further include an administrator interface for transmitting one or more messages from an administrator to the hydrogen generation network. It is contemplated that the administrator interface can include at least one processor in communication with data storage. Computer instructions resident in the data storage can be used to instruct the processor to transmit one or more messages to the hydrogen generation network.

The administrator interface can be a computer, a cellular telephone, a personal digital assistant, or other similar devices able to input data, messages, and commands into a processor. The administrator interface can also be a local area network interface, a wide area network interface, a virtual private network interface, a synchronous transfer mode interface, a synchronous optical network interface, a call center, a voice mail, or another similar means to transmit messages to numerous contacts.

In a contemplated embodiment, the administrator interface can have one or more security features, such as encryption, a password-protected user account, or biometric files to control access to the administrator interface, any messages or responses, or other parts of the present system.

The administrator interface can also include a "call me" feature, enabling an administrator to compose a message to send out to at least one user.

An administrator can be a power supplier, a governmental agency, a digital notification system, an analog notification system, a computer system, an entity responsible for coordinating dispatchable and non-dispatchable power to a hydrogen generation network, a processor in communication with the present system, and combinations thereof.

In a contemplated embodiment, the data storage can include computer instructions for instructing the one or more processors to monitor the hydrogen generation network and manage use of dispatchable power sources, non-dispatchable power sources, or combinations thereof for tracking power use by one or more hydrogen generating devices.

In an embodiment, the administrator can manage distribution and usage of the dispatchable and non-dispatchable power to the hydrogen generation network based on user response, and/or by increasing demand or limiting demand using these messages.

The present system can also include a dynamic information database resident in the data storage. The dynamic information database includes at least one hydrogen generating device identification for one or more hydrogen generating devices in the network, discretionary power consumption information for one or more hydrogen generating devices in the network, or combinations thereof. The dispatchable power source information, the non-dispatchable power source information, or combinations thereof can also be contained in the dynamic information database.

Discretionary power consumption information can include information regarding an amount of power required by one or more hydrogen generating devices during a time interval that can be determined by an administrator.

It is contemplated that the discretionary power consumption information can be assigned a priority code based on one or more power rates, a classification of related hydrogen generating devices, a quantity of power required by related hydrogen generating devices, or combinations thereof.

For example, a priority codes of "100" can be assigned for users having critical needs, such as hospitals, a priority code of "200" can be used for less critical users, such as grocery stores, a priority code of "300" can be used for a business, and a priority code of "400" can be used for a residence. Specific hydrogen generating devices can also be assigned priority codes.

Power rates can include one or more predetermined fees per kilowatt hour, and a user can be associated with a higher priority code due to a larger required payment per kilowatt hour. It is also contemplated that priority codes can be paired with one or more hydrogen generating devices in the hydrogen generation network.

It is contemplated that an administrator can initiate distribution of at least one message to the hydrogen generation network for providing non-dispatchable power information, dispatchable power information, or combinations thereof to the hydrogen generation network through at least one industry standard protocol. At least one hydrogen generating device can then provide one or more responses to the administrator interface.

The one or more messages can include predefined messages, custom messages, or combinations thereof. The messages can include audio files, such as MP3 files, MP4 files, WAV files, AIFF files, AVI files, or ACC files, image files, such as BMP or JPG files, video files, such as H.264 Mpeg files, text files, electronic signals, such as radio transmissions, or combinations thereof. It is contemplated that audio files can be transmitted via e-mail, phone, a link on a website, or combinations thereof.

The data storage can include a text-to-sound file converter, such as a Real Speak text-to-sound converter, of Burlington, Mass. USA, for translating messages from text files to sound files. The text-to-sound file converter is beneficial for ensuring recognition of messages upon arrival, because the one or more messages remain consistent through delivery by the same voice, with the same accent, dynamic, and delivery speed. Additionally, use of a text-to-sound file converter enables individuals with disabilities, namely visual impairment, to also receive messages.

Industry standard protocols can include a Megaco/H.248 protocol, a simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

In a contemplated embodiment, the messages, responses, or combinations thereof can be transmitted through two or more industry standard protocols simultaneously. It is also contemplated that messages and responses can be transmitted simultaneously to multiple devices of a single individual, over one or multiple networks, in multiple languages.

For example, the administrator interface could be used to transmit a message simultaneously to a single user's computer over the internet using a first industry standard protocol, and to a single user's cellular telephone over a cellular network using a second industry standard protocol. The message sent to the user's computer could be a textual message in English, while the message sent to the user's cellular telephone could be an audio file containing the same message, in Spanish. It is further contemplated that one or more messages can be translated and broadcast in multiple languages, and one or more users can select a language in which to receive a message. A machine translator, such as Systran™ of San Diego, can be used.

User-selected languages or preset languages can be used and saved in the data storage so that future messages are transmitted automatically in selected languages. The translator is beneficial, because not all users in a network may speak the same language, such as in Canada, where a portion of a hydrogen generation network might speak French and another portion of the hydrogen generation network might speak English. This feature ensures smooth and effortless communication between groups of people with language differences and enables the present embodiments to be used simultaneously in multiple countries having different languages.

In an embodiment, the data storage can include computer instructions for instructing the processor to permit an administrator to cancel one or more messages when in progress. The computer instructions can also permit the administrator to cancel one or more messages scheduled for delivery at a later date or time.

Alternatively, a computer instructions can be used to instruct the processor to monitor available power, and cancel messages indicating available power when preset limits are exceeded.

Computer instructions can also be resident in the data storage for instructing the processor to provide a notification to the administrator when one or more messages have been delivered to the hydrogen generating device.

In an embodiment, the present system can include one or more user contact devices in communication with the administrator interface, having related user contact device information. The user contact device information can be contained in the dynamic information database. User contact device information can be associated with one or more hydrogen generating devices.

User contact devices can include a cellular telephone, a television, a light emitting diode (LED) display, a land phone line, an e-mail address, a fax machine, a pager, a digital display, handheld wireless devices, such as personal digital assistants (PDA) and Blackberries™, and other similar devices.

It is contemplated that one or more user contact devices can enable users to contact the administrator interface to provide commands to disable or enable one or more hydrogen generating devices on demand. Users having the ability to disable or enable devices "on demand" are contemplated to have the ability to override another party's ability to control power to the hydrogen generating devices, such as when national security requires home use of a hydrogen generating device to be restricted in favor of military use.

One or more users contact devices can receive messages sent via the administrator, and each user contact device can be used to transmit a response through one or more industry standard protocols to the dynamic information database.

The one more users can include individuals, a police department, a school, a fire department, a hospital, a government agency, a military department, a consumer, a business, an association, or combinations thereof. It is also contemplated that users can include owners of hydrogen generating devices.

Responses can indicate that one or more messages have been successfully received, or responses can indicate a specific need of a user. For example, a user could transmit a response indicating a need for a specific amount of power for a certain hydrogen generating device on a specific date and time.

It is contemplated that computer instructions in the data storage can instruct the processor to transmit one or more messages to at least one user contact device at periodic intervals or at a specific date, one or more user contact devices in a defined geographic area, such as "Texas", or disaster zone, such as a hurricane-affected area where a state of emergency has been declared, or combinations thereof.

It is further contemplated that the computer instructions can instruct the processor to transmit one or more messages to one or more hydrogen generating devices at periodic intervals or at a specific date, or to one or more hydrogen generating devices in a defined geographic area or a designated disaster zone.

In an embodiment, the dynamic information database can also include a response code from one or more hydrogen generating devices, an "error in response" code indicating that insufficient hydrogen generating device information existed to contact one or more hydrogen generating devices, or combinations thereof. The dynamic information database can also include response codes and "error in response" codes for one or more user contact devices.

The "error in response" information can also indicate that an e-mail address or phone number is invalid. This error in response information can be noted textually, such as in a report, can be indicated a tone message or another electronic signal indicating no response, or other similar indications.

The dynamic information database can also include a hydrogen generating device location for one or more hydrogen generating devices. The hydrogen generating device location can be a physical address, an electronic address such as an internet protocol (IP) address, or combinations thereof.

The dynamic information database can further include grouping information, such as a geographic zone, a quantity of power consumption for one or more hydrogen generating devices, a transmission capacity of the hydrogen generation network, or combinations thereof. For example, a geographic zone could be "the Gulf Coast region of the United States", the quantity of power consumption needed could be "hospital hydrogen generating device needing 10,000-30,000 kilowatt hours per month". The transmission capacity of the hydrogen generation network can include information such as how much power the can be dispatched to individual hydrogen generating devices per hour, per day, or over another time interval.

In an embodiment, the administrator interface can include a responder module having a receiver function for receiving responses from one or more user contact devices, hydrogen generating devices, or combinations thereof. The responder module can include an opt-in feature, an opt-out feature, or combinations thereof, for allowing one or more users or administrators to select whether messages and responses are received.

For example, a responder module can include be a software program designed to acknowledge responses that arrive from users, hydrogen generating devices, error in response messages, or combinations thereof, and provide tallies of each response received The administrator interface can further include computer instructions for instructing the processor to generate one or more reports using content in the dynamic information database. The reports can contain response information for one or more messages sent by the administrator, hydrogen generating device information, time and dates, geographic zones to which the report applies, power consumption in view of preset limits and excesses of preset or predefined limits, error in response information, and similar data.

The reports can include a date a message was sent, such as Apr. 2, 2007; a time the message was sent, such as 4:10 pm; a date the message was received, such as Apr. 3, 2007; a time the message was received, such as 4:20 pm, and content of the message, such as "rolling brown out at 2 pm Apr. 4, 2007." Content of the message can be included independent of whether whole or partial message transmission occurred.

In addition the report can include user response information which can include responses, such as "I received the message from the administrator and need assistance in power because I have a security emergency" sent by a user. The report can further include response information, which can include responses from responders attempting to assist users in need, and can also include "error-in-response" information such as a tone or other communication that indicates the message did not reach the intended user contact device or hydrogen generating device.

It is contemplated that custom reports can be created by an administrator. It is further contemplated that standard reports can be generated from the dynamic information database for use by the administrator.

In a contemplated embodiment, multiple hydrogen generation networks can be used to manage and communicate with one or more hydrogen generating devices. Single hydrogen generation devices can communicate with multiple networks.

The present system can be used to contact individuals or hydrogen generating devices, to manage power and hydrogen access among vendors and providers during power outages and emergency conditions, such as storms or fire, and to provide notification of important information, such as thunderstorm warnings, flash flood warnings, tornado warnings, and similar information. Additionally, terrorist threat levels can be transmitted using the present system.

A further benefit of the present embodiments is that users can receive messages on a real-time, instantaneous basis. The present embodiments provide a system with a high speed notification and response time, in which information is accessed and stored in a dynamic information database, and can be conveyed to users with user contact devices in a specific priority order. Messages can be conveyed in less than 3 minutes to over 1000 users. Users can be contacted automatically when specific conditions arise, or messages can be transmitted when initiated by an administrator using an administrator interface. Any number of users can be contacted in a systematic manner, and multiple responses can be obtained and stored.

The present embodiments can be used to save lives through the notification of large groups of individuals instantaneously concerning dangerous power outages that may affect critical facilities, military facilities, and hydrogen generating facilities where power outages can result in safety hazards. Messages can be sent to prevent false rumors that a situation is safe. Panic and chaos can be controlled through transmission of one or more consistent messages to all users in communication with the present system.

The present embodiments allow responses from users to be collected so that administrators can send help to users that are in danger, or are experiencing difficulties regarding one or more hydrogen generating devices.

With reference to the figures, FIG. 1 depicts an embodiment of a digital notification and response system for hydrogen generation network.

User 20 is depicted within hydrogen generation network 18, in communication with user contact devices 22a and 22b. While user 20 is depicted in communication with two user contact devices, any number of users can be in communication with any number of user contact devices.

FIG. 1 also depicts at least one user 20 in communication with at least one hydrogen generating device 80 which is in communication with the hydrogen generation network 18. It is contemplated that the hydrogen generation network 18 can contain many user contact devices such as over 10,000 users with at least a similar number of hydrogen generating devices.

User contact devices 22a and 22b and the hydrogen generating device 80 can each generate a response 50a-e to the hydrogen generation network 18.

An administrator interface 10, is used for preparing and transmitting messages 12a and 12b, which can be in one or more languages, from an administrator 16 using at least one processor 14a or 14b.

FIG. 1 depicts two processors 14a and 14b, though any number of processors can be used depending on the number of messages, users, and hydrogen generating devices in communication with the administrator interface 10.

Further, while FIG. 1 depicts two messages 12a and 12b, any number of identical messages or different, individualized messages can be sent to any number of individual users.

Administrator interface 10 can be a computer, a cellular telephone, a personal digital assistant, or other similar devices able to input data, messages 12a and 12b, and commands into processors 14a and 14b. The administrator interface 10 can also be a local area network interface, a wide area network interface, a virtual private network interface, a synchronous transfer mode interface, a synchronous optical network interface, a call center, a voice mail, or another similar means to transmit a message to numerous contacts.

The processors 14a and 14b communicate with a dynamic information database 24 stored in data storage 79 in communication with the one or more processors 14a, 14b.

The dynamic information database 24 is used for preparing the messages 12a or 12b and receiving responses 50a, 50b, 50c, and 50d from individual users, or response 50e from hydrogen generating device 80.

Figure 2:
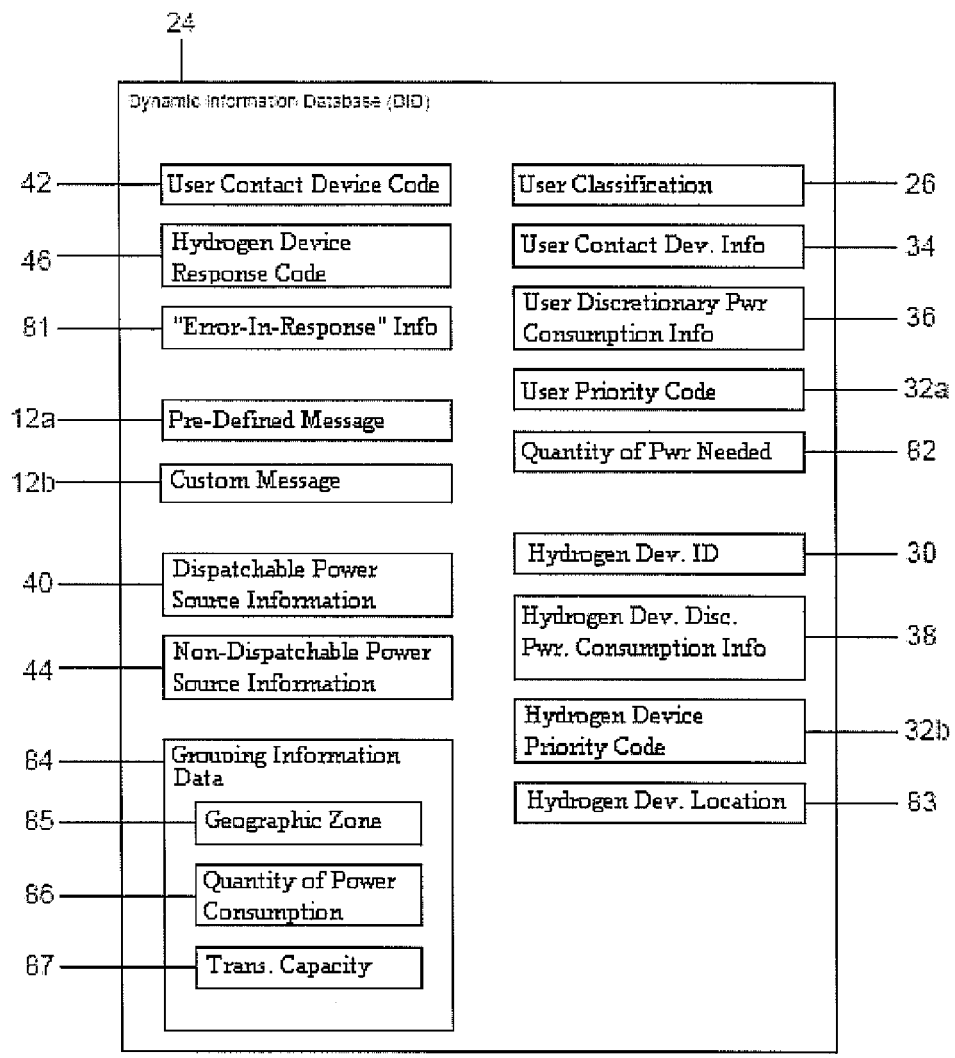
FIG. 2 depicts a representation of an embodiment of a dynamic information database associated with a digital notification and response system.

The administrator interface 10 initiates distribution of messages 12a and 12b to the hydrogen generation network 18 using information from the dynamic information database 24, namely, grouping information data 84, user contact device information 34, and priority codes for users 32a and priority codes for hydrogen generating devices 32b, depicted in FIG. 2.

The priority codes 32a and 32b can be a priority order that directs the administrator interface 10 to contact a first group of user contact devices, indicated as a first contact. After all of the user contact devices in the first contact have received the message, a priority order can be used to direct the administrator interface 10 to contact a second group of user contact devices, indicated as a second contact. For example, the priority order set by a particular user can include sending an e-mail to a PDA with a defined email address, then calling a home phone number to transmit an audio message, then calling a work phone number. The administrator interface 10 then transmits the message in that priority order. The priority code can be used for a single user, all users in the network, or any intermediate number of users.

In an embodiment, it is contemplated that the administrator interface can continue to contact user contact devices based on the priority order indicated by the users of the system, until all user contact devices are reached, and a response is provided from each user contact device to the dynamic information database. The response from the each user contact device can be "message received," or an individualized message that is actuated by the user.

FIG. 1 depicts administrator interface 10 in communication with a text-to-speech converter 7 and a language translator 52.

In an embodiment the administrator 16 can cancel any messages in progress, or any messages pre-set to be sent on a specific date or time or in the case of a specific event or situation using computer instructions for cancelling a message 92.

Computer instructions 92 can additionally enable administrator 16 to transmit a "disregard message" notification to users that received a message in error, such as when a message is erroneously transmitted or contains erroneous information.

The messages 12a or 12b can be transmitted through one or more industry standard protocols 48a and 48b, individually or simultaneously. Industry standard protocols 48a and 48b can be any type of gateway protocol or similar protocol. Messages 12a and 12b are then received by user contact devices 22a and 22b or hydrogen generating device 80 within the hydrogen generation network 18.

In an embodiment, it is contemplated that the administrator interface 10 can initiate the sending of messages 12a and 12b automatically upon a disaster. For example, if a storm destroys multiple power lines in a specified area, the administrator interface 10 can be notified automatically, and can send the messages 12a and 12b to the appropriate user contact devices of affected users.

In different embodiments, it is contemplated that the messages 12a and 12b can be text messages, numerical messages, one or more images, or combinations thereof. The messages 12a, 12b can be encoded, such as by using encryption means, such as AES 128 or 3DES encryption.

The messages 12a, 12b can include a designation that identifies each messages' importance to all users of the hydrogen generation network 18. Possible designations can include low priority, general priority, significant priority, high priority, and severe priority. The designations can coincide with the US Department of Homeland Security's five-color system. For example, the designations can be color-coded, such as green for a low priority message, blue for a preparedness message or general priority message, yellow for a cautionary message such as a significant priority, orange for an emergency message or high priority message, or red for a critical message with a severe priority. These priority levels can be customized to levels of emergencies, such as the use of red for a category 5 hurricane.

The messages 12a, 12b can be stored on the dynamic information database 24. The messages 12a, 12b can be pre-written messages stored in the dynamic information database 24 for subsequent use by the administrator 16 or can be generated from the dynamic information database 24 based upon inputs from the administrator 16, creating "custom messages" that can be transmitted using the administrator interface 10.

The administrator interface 10 can also include a "call me" feature 13. The "call me" feature 13 enables an administrator 16 to compose a message to send to members of the hydrogen generation network 18.

FIG. 1 also depicts computer instructions to notify the administrator 93 disposed within the data storage 79 to advise the administrator 16 regarding available dispatchable and non-dispatchable power and upcoming usage needs, and notifying the administrator 16 regarding whether messages 12a, 12b reached their intended users. Additionally FIG. 1 shows computer instructions in the data storage 79 for broadcasting 94 as described above. Computer instructions for generating reports 95 can also be contained in the data storage 79.

The administrator interface 10 can further include a responder module 96, as described previously, and a security feature 97.

The responder module 96 can include computer instructions that enable a receiver function to receive responses from various users that reply to messages and/or a storage function for recording received responses in audio files, a dual-tone multi-frequency "DTMF", and/or an interactive voice response "IVR" format.

In an embodiment, the responder module can have a reporting function for providing the status of the responses to the administrator. The information obtainable through reporting function can be protected using security access features which can include encryption, a user log in with password, or a biometric file. The security access features can also include a bar code reader, a radio frequency identification device "RFID" tag reader, a scannable badge reader, a security token, a smart card reader, a magnetic card reader, and combinations thereof.

FIG. 2 shows a schematic depiction of the dynamic information database 24. The dynamic information database 24 can be a SQL™ database, MySQL™ database or other industry standard databases, an Oracle™ database, or other similar databases that can organize information in a similar manner.

It is contemplated that the dynamic information database 24 can be resident in data storage 79 in communication with processors 14a and 14b. The dynamic information database 24 contains a user classification 26, such as a type of facility or individual, for each user, such as user 20, depicted in FIG. 1.

For example, a user facility can contain a hydrogen generating device 80, and each such facility can have a related user classification. For example, a hospital can have a hydrogen generating device and be classified as a "critical care" facility, which can require constant power. In contrast, a residential user can be classified as "evening status," and receive power for a hydrogen generating device only in the evening after work hours.

Classifications and priorities can be assigned based on status, such as an emergency care provider, a high end residency, a military operation facilities, a homeland security facility, a critical governmental facility, a general public facility, a communication network, a traffic system, a public broadcast system, and other similar systems.

User contact device information 34 is also included in dynamic information database 24 and can include an e-mail address, an internet protocol (IP) address, a phone number, and combinations thereof. User contact information 34 can further include the user's name, the user's address, the user's phone number, the user's device address, the user's social security number, an account code, and combinations thereof. Each user contact device can include information that is unique to each individual user contact device or can include information that is common to all contact devices. For example, a serial number for a cellular phone, a Mac address for an Ethernet card, and other telecommunication device information can be included in dynamic information database 24.

Additionally, dynamic information database 24 contains hydrogen generating device identification 30 such as an identification code, an address, a phone number, a social security number of users at the hydrogen generating device 80, a tax identification number, a bank account, or combinations thereof, for each hydrogen generating device 80 in the hydrogen generation network. Similar information can be stored in the dynamic information database 24 relating to each user within the network such as dispatchable power source information 40, and non-dispatchable power source information 44. Hydrogen generating device identification 30 can include information sufficient for the administrator interface 10 to transmit messages and receive response from related hydrogen generating devices.

Dynamic information database 24 can include user discretionary power consumption information 36 for at least one user of the hydrogen generation network, which can be an amount of power that at least one user requires during a time interval that can be determined by an administrator, such as 4 hours, 8 hours, 2 hours every Sunday, or 3 hours on "date" night. The dynamic information database 24 can also contain discretionary power consumption information of each hydrogen generating device in the network.

It is additionally contemplated that the discretionary power consumption information can be assigned a priority code based on power rates. Alternatively, one or more users can have a classification code which indicates a quantity of power needed by a user. For example, power rates can be set at one or more predetermined fees per kilowatt hour, and a user can be associated with a higher priority code because of higher payment per kilowatt hour.

Non-dispatchable power source 40 can relate to a wind power facility, a solar powered facility, or an intermittent water supply hydroelectric facility for providing electricity. Dispatchable power source information 44 can relate to a hydroelectric power plant, a hydrocarbon based electrical production facility, a nuclear power plant, a geothermal power generation facility, a bank of batteries, at least one capacitor, at least one fuel cell, or a tidal power generator using ocean tides, which provides electricity to the user or the hydrogen generating device.

The dynamic information database 24 can include response codes from user contact devices 42, and response codes from hydrogen generating devices 46, relating to responses received from a user, or a hydrogen generating device.

"Error-in-Response" information 81 can also be tracked by the database 24. Error in response information can relate to failed attempts to transmit a message to a user contact device or to a hydrogen generating device. Error in response codes can be received when insufficient user contact device information exists to contact a user contact device or insufficient hydrogen generating device information exists to contact a hydrogen generating device. Error in response data and response data provides the administrator with knowledge whether or not one or more messages have reached the intended recipients.

The "Error-in-Response" information 81 can also indicate that an e-mail address or phone number is invalid. This Error-in-Response information can be noted in the report as an invalid number, and can be indicated a tone message or another electronic signal indicating no response.

The dynamic information database 24 can also include information regarding the amount of power needed by a particular user 82 and information regarding the hydrogen generating device location 83.

Grouping information 84 of the dynamic information database 24, can include geographic zones 85, quantity of power consumption for a group of users 86, and transmission capacity of the network 87.

Figure 3:
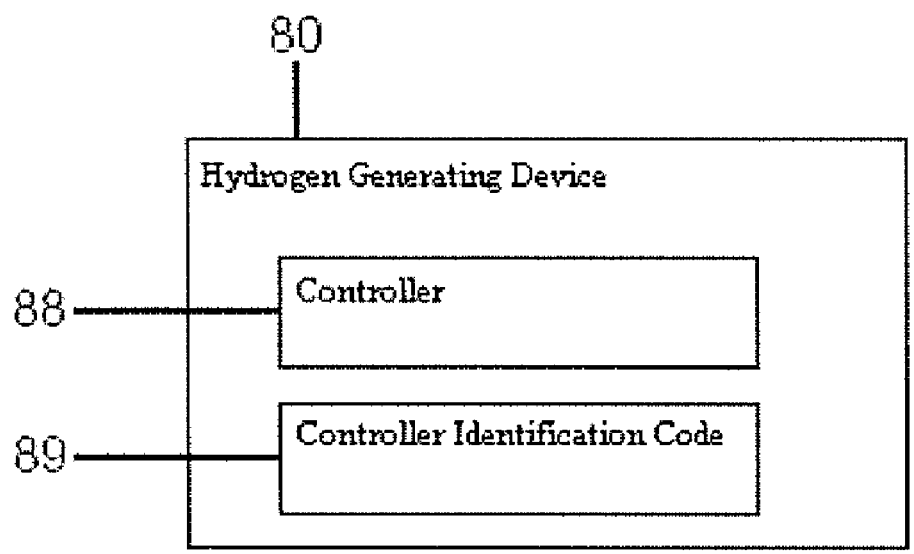
FIG. 3 depicts a representation of an embodiment of a hydrogen generating device.

It is further contemplated that the hydrogen generating device 80 can include at least two elements shown in FIG. 3, namely, a controller 88, a controller identification code 89, or combinations thereof.

The dynamic information database can store one or more responses and unique address of each user contact device. Responses can be audio files or dual-tone multi-frequency "DTMF" tones, also known as touch tones. The "DTMF" tone can be used for telephone signaling over a line in a voice frequency band to a call switching center. The response from the user contact device can also be a text telephone such as "TTY" communication, including teletype communication, or a time division duplex (TDD) communication.

The embodiments have been described in detail with particular reference to certain preferred embodiments, thereof, but it will be understood that variations and modifications can be effected within the scope of the embodiments, especially to those skilled in the art.

What is claimed is:

1. A power management system for a hydrogen generation network comprising:
   a. a decentralized hydrogen generation network comprising at least one hydrogen generating device operable by at least one dispatchable power source comprising dispatchable power source information, at least one non-dispatchable power source comprising non-dispatchable power source information, or combinations thereof;
   b. an administrator interface for transmitting at least one message from an administrator to a hydrogen generation network, wherein the administrator interface comprises at least one processor in communication with data storage;
   c. a dynamic information database resident in the data storage, wherein the dynamic information database comprises:
      i. at least one hydrogen generating device identification for the at least one hydrogen generating device, discretionary power consumption information of the at least one hydrogen generating device, or combinations thereof;
      ii. the dispatchable power source information, the non-dispatchable power source information, or combinations thereof;
   d. computer instructions resident in the data storage for instructing the at least one processor to provide the at least one message to the hydrogen generation network; and wherein an administrator initiates distribution of the at least one message to the hydrogen generation network for providing the non-dispatchable power information, the dispatchable power information, or combinations thereof to the hydrogen generation network through at least one industry standard protocol, and wherein the at least one hydrogen generating device provides at least one response to the administrator interface.

2. The system of claim 1, further comprising at least one user contact device comprising user contact device information, wherein the user contact device is in communication with the administrator interface.

3. The system of claim 2, wherein the at least one user contact device enables at least one user to contact the administrator interface to provide at least one command to disable or enable the at least one hydrogen generating device on demand.

4. The system of claim 2, wherein the at least one message is received by the at least one user contact device, and the at least one user contact device transmits a response through the at least one industry standard protocol to the dynamic information database.

5. The system of claim 1, wherein the data storage further comprises computer instructions for instructing the at least one processor to monitor the hydrogen generation network and manage use of: the at least one dispatchable power source, the at least one non-dispatchable power source, or combinations thereof for tracking power usage by the at least one hydrogen generating device.

6. The system of claim 1, wherein the dynamic information database further comprises: a response code from the at least one hydrogen generating device, an "error in response" code that indicates insufficient hydrogen generating device information existed to contact the at least one hydrogen generating device, or combinations thereof.

7. The system of claim 2, wherein the dynamic information database further comprises: a response code from the at least one user contact device, an "error in response" code that indicates insufficient user contact device information existed to contact the at least one user contact device, or combinations thereof.

8. The system of claim 1, wherein the at least one message comprises at least one predefined message, at least one custom message, or combinations thereof.

9. The system of claim 3, wherein the at least one user is an owner of the at least one hydrogen generating device.

10. The system of claim 1, wherein the at least one non-dispatchable power source is a member of the group consisting of: a wind power facility, a solar power facility, ocean power facility using wave height, currents, or combinations thereof, an intermittent water supply hydroelectric facility, or combinations thereof.

11. The system of claim 1, wherein the at least one dispatchable power source is a member of the group consisting of: a hydroelectric power plant, a hydrocarbon based electrical production facility, a nuclear power plant, a geothermal power generation facility, a bank of batteries, at least one capacitor, at least one fuel cell, an ocean powered facility using tidal power, or combinations thereof.

12. The system of claim 1, wherein the discretionary power consumption information comprises an amount of power that the at least one hydrogen generating device requires during a time interval that can be determined by the administrator.

13. The system of claim 1, wherein the discretionary power consumption information is assigned a priority code based on at least one power rate, a classification of the at least one hydrogen generating device, a quantity of power needed by the at least one hydrogen generating device, or combinations thereof.

14. The system of claim 2, wherein the dynamic information database associates the user contact device information with the at least one hydrogen generating device.

15. The system of claim 1, wherein the dynamic information database further comprises a hydrogen generating device location for the at least one hydrogen generating device.

16. The system of claim 1, wherein the dynamic information database further comprises grouping information.

17. The system of claim 16, wherein the grouping information comprises a member of the group consisting of: a geographic zone, a quantity of power consumption of the at least one hydrogen generating device, a transmission capacity of the hydrogen generation network, and combinations thereof.

18. The system of claim 1, wherein the at least one hydrogen generating device comprises a hydrogen generating device processor and a hydrogen generating device identification code.

19. The system of claim 1, wherein the administrator is a member of the group consisting of: a dispatchable power supplier, a non-dispatchable power supplier, a government agency, an entity responsible for coordinating dispatchable power, non-dispatchable power, and combinations thereof to the hydrogen generation network, a processor in communication with the dynamic information database, a digital notification and response system, an analog notification system, and combinations thereof.

20. The system of claim 1, wherein the at least one industry standard protocol is selected from the group consisting of: a Megaco/H.248 protocol, a simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

21. The system of claim 1, wherein the data storage further comprises computer instructions for instructing the at least one processor to permit the administrator to cancel the at least one message when the at least one message is in progress.

22. The system of claim 1, wherein the data storage further comprises computer instructions for instructing the at least one processor to permit the administrator to cancel the at least one message when the at least one message is scheduled for delivery at a future date and time.

23. The system of claim 1, wherein the data storage further comprises computer instructions for instructing the at least one processor to provide a notification to the administrator interface for notifying the administrator when the at least one message has been delivered to at least one hydrogen generating device.

24. The system of claim 2, wherein the data storage further comprises computer instructions for instructing the at least one processor to transmit the at least one message to a member of the group consisting of: the at least one user contact device at periodic intervals, the at least one user contact device in a defined geographic area, the at least one user contact device in a designated disaster zone, the at least one user contact device at a specific date and time, or combinations thereof.

25. The system of claim 1, wherein the data storage further comprises computer instructions for instructing the at least one processor to transmit the at least one message to a member of the group consisting of: the at least one hydrogen generating device at periodic intervals, the at least one hydrogen generating device in a defined geographic area, the at least one hydrogen generating device in a designated disaster zone, the at least one hydrogen generating device at a specific date and time, or combinations thereof.

26. The system of claim 1, further comprising a member of the group consisting of: at least one security feature for controlling access to the administrator interface, at least one security feature for controlling access to the at least one message, the at least one response, or combinations thereof, at least one security feature for controlling access to the dynamic information database, or combinations thereof.

27. The system of claim 2, wherein the administrator interface further comprises a responder module comprising a receiver function for receiving responses from a member of the group consisting of: the at least one user contact device, the at least one hydrogen generating device or combinations thereof.

28. The system of claim 27, wherein the responder module further comprises an opt-in feature, an opt-out feature, or combinations thereof.

29. The system of claim 1, wherein the at least one message is an audio file, an image file, a video file, a text file, an electronic signal, or a combination thereof.

30. The system of claim 29, wherein the audio file is transmitted by e-mail, phone, a link on a website, or combinations thereof.

31. The system of claim 1, wherein the data storage further comprises computer instructions for instructing the at least one processor to generate at least one report using content in the dynamic information database.

32. The system of claim 1, wherein the data storage further comprises a text-to-sound file converter for translating the at least one message from text to a sound file.

33. The system of claim 1, wherein the dynamic information database further comprises at least one priority code associated with the at least one hydrogen generating device.

34. The system of claim 1, wherein the at least one hydrogen generating device communicates between at least two hydrogen generation networks simultaneously.

* * * * *